United States Patent Office 3,453,835
Patented July 8, 1969

3,453,835
ABSORPTION OF CO$_2$ EMPLOYING SEPARATELY COOLED ABSORBENT STREAMS
Gerhard L. Hochgesand, Neu-Isenburg, Germany, assignor to Metallgesellschaft, Aktiengesellschaft-Linde Aktiengesellschaft, Frankfurt am Main, Germany, a corporation of Germany
Filed Nov. 15, 1966, Ser. No. 594,521
Claims priority, application Germany, Nov. 15, 1965, M 67,274
Int. Cl. F25j 3/06; B01d 53/16
U.S. Cl. 62—17       6 Claims

ABSTRACT OF THE DISCLOSURE

A gas mixture containing carbon dioxide is cooled to condense a portion of the carbon dioxide therefrom after which the condensate and uncondensed gas mixture are introduced into an absorption zone. Carbon dioxide is absorbed therein by contact with separate streams of absorbent. The stream of absorbent entering the lower section of the absorber is cooled by indirect heat exchange while the other stream of absorbent entering the top of the absorber is regenerated in plural flashing stages and by stripping with cold inert gas.

---

Figure 1:
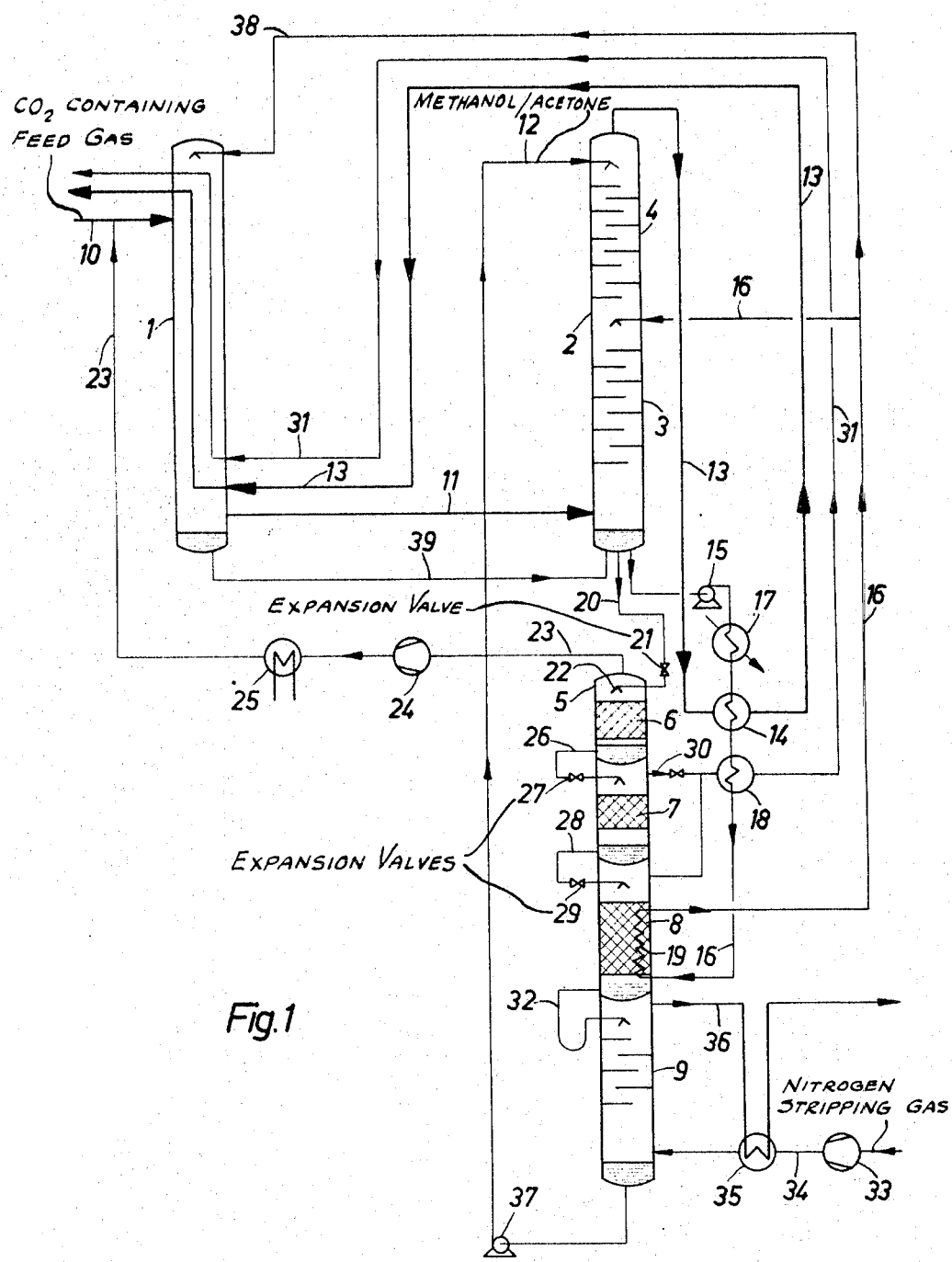

This invention relates to the resolution of gas mixtures. It more particularly refers to the removal of at least carbon dioxide from gas mixtures.

Synthesis gas is a mixture of carbon monoxide and hydrogen. Synthesis gas is used to produce methanol and to produce ammonia. In the past, synthesis gas has also been used to produce hydrocarbons by interaction between the carbon monoxide and the hydrogen. Synthesis gas is also used as a source of hydrogen by reaction thereof with steam to form a mixture of carbon dioxide and hydrogen. Synthesis gas, water gas and other mixtures of carbon monoxide and hydrogen are therefore quite valuable in themselves as well as sources for large quantities of hydrogen.

These carbon monoxide-hydrogen gas mixtures are often produced by the gassification of solid or liquid fuels with steam and, in some cases, with oxygen or air, or the cleavage of liquid or gaseous hydrocarbons with steam, are accordingly important sources of hydrogen, carbon monoxide and mixtures thereof as basic raw materials of the chemical industry.

In order to be useful, produced or naturally occurring mixtures of carbon monoxide or hydrogen alone must be purified to remove some or all of the undesirable components therefrom.

The impurities which have to be removed from the gas mixtures containing carbon monoxide and hydrogen produced by gassification or cleavage of solid, liquid or gaseous fuels with water vapor and in some cases oxygen are carbon dioxide, hydrogen sulfide, organic sulfur compounds including carbon oxysulfide, methane in a few cases and even the carbon monoxide itself in the case of the production of pure hydrogen.

In the manufacture of combustible gases for the production of heating gases, such as city gas, similar gas purification needs are involved. In any case the removal of sulfur is called for. In this regard, the removal of carbon dioxide is practiced in order to adjust the heating value and density of the gas. The carbon monoxide content can be reduced for detoxification purposes by hydrogenating it to form methane or by reacting it with steam to produce hydrogen and carbon dioxide.

Desulfuration is generally the most important problem in the purification of natural gases, in which hydrogen sulfide contents between 10 and 20% by volume are not rare. Occurrences of natural gas are known, however, in which the carbon dioxide contents exceed 20% by volume.

If the transformation of carbon monoxide with steam to form hydrogen and carbon dioxide (carbon monoxide conversion) is performed with the gases named above, the result is necessarily an increase in the carbon dioxide content, which can amount to as much as 50% by volume in the case, for example, of the manufacture of hydrogen.

Chemical gas washing processes have long been known for the removal of acid components such as CO$_2$, H$_2$S, HCN and SO$_2$ from technical gases. They use alkalinely reacting absorption solutions which bind the acid gas components to the alkali content thereof. These solutions can be regenerated and made reusable by heating them and blowing them out with steam or air. Further, if the gas scrubbing is performed under elevated pressure, purification may be accomplished by relieving the pressure. The absorption capacity of these solutions is subject to the laws of stoichiometry.

To wash out high concentrations of gas impurities and/or to purify very great quantities of gas, elevated pressure physical gas washing processes have been preferred in recent times.

The simplest physical gas washing process is water scrubbing under pressure to remove carbon dioxide and, in some cases, to remove hydrogen sulfide. This process is based on the comparatively high and selective ability of water to dissolve CO$_2$ and H$_2$S in contrast to CO, H$_2$ and CH$_4$. The CO$_2$ and H$_2$S absorbed in the water from the gas at high pressure in the absorption stage are driven out of the water when the pressure thereon is reduced to ambient pressure in the regeneration stage. The water can then be reused as an absorption agent. It has been proposed to use numerous organic liquids in addition to or instead of water as absorbents for physical gas washing processes described above.

One of the oldest examples of such non-aqueous processes is oil washing for the absorption of benzene, naphthaline, etc., from coke-oven gas. More recently, these processes have used methanol, acetone, ethylene glycol, and carboxylic acid esters of low alcohols at high pressures and low temperatures as absorbents for the removal of CO$_2$ from gases. Many of these solvents are capable of removing simultaneously, and substantially equally well, several impurities from the gas, such as CO$_2$, H$_2$S organic sulfur compounds and low molecular weight saturated and unsaturated hydrocarbons.

The dissolving power of any physical absorbent depends primarily upon the pressure and temperature at which the gas scrubbing is performed. The physical solubility of any liquid increases as the temperature falls and the pressure increases. Conversely, the absorbent is regenerated performed by pressure reduction (expansion) and/or by temperature elevation.

According to one of these prior-art processes, which operated with methanol as the absorbent at temperatures below —10° C. and at pressures above 2 atmospheres gauge, a raw gas from the pressure gassification of coal, which was produced at a pressure of 20 atmospheres gauge, and contained approximately 4 vol.-percent of sulfur compounds plus about 30 vol.-percent of CO$_2$, was cooled and the condensate separated and brought to synthesis-gas quality by washing at —30 to —40° C. in a single washing process, the washing gas throughout ranging from about 50,000 to 150,000 Nm.$^3$ per hour. In a single washing process, or for that matter in a multiple-stage process, not only CO$_2$ and H$_2$S, but also the organic sulfur compounds and especially lower unsaturated hydrocarbons known to be resin formers, are all removed together.

In the gassification or cleavage, particularly of liquid or gaseous fuels with steam and, in some cases, oxygen or air, for the production of a raw synthesis gas, the trend is to perform the raw gas production at elevated pressures. It has already been proposed that the raw gas production be performed at the pressure under which the synthesis that consumes the product gas is performed. Processes which operate at pressures above 50 atmospheres absolute, e.g., from 70 to 170 atmospheres absolute, have become known, especially for the cleavage of liquid hydrocarbons.

The completion of all of the compression work prior to the manufacture of the gas results in a simplification of the plant and a reduction of the power costs. Furthermore, such a procedure offers a simple and advantageous possibility for the use of gases which naturally occur under high pressure.

The use of high pressure processes makes possible a number of advantages in the gas treatment stages following the manufacture of the synthesis or other similar gas. These improvements may even carry over into the process for using this gas, e.g., in methanol synthesis, etc. These improvements are particularly prevalent in such stages as the carbon monoxide conversion and gas scrubbing. It is unfortunate, but a number of complications are also created by the use of high pressure processes.

When physical absorbents are used for gas purification, one of the advantages is that a smaller quantity of absorbent is needed, and accordingly smaller apparatus can be used, and another is that, under certain circumstances, the absorption temperatures are not as low as with other materials and may even be above 0° C.

One disadvantage lies in the fact that, after the partial or complete transformation of carbon monoxide with steam to carbon dioxide and hydrogen, very high carbon dioxide concentrations in the gas are attained. At these concentrations, the condensation of liquid $CO_2$ takes place at temperatures above $-30°$ C., or even above 0° C. in many cases. For example, at a $CO_2$ partial pressure of 45 atm. abs., the $CO_2$ dewpoint lies at around $+10°$ C.

Attempts have already been made to separate by condensation a large part of the carbon dioxide present in carbon dioxide-rich gases, and to wash the gaseous remainder out of the gas by conventional processes using methanol, for example, as the absorbent. In this procedure, the cooling of the gas for the condensation of the $CO_2$ must be performed indirectly. The temperature in this cooling action may not pass below the triple point of carbon dioxide at $-57°$ C. But the result is that the $CO_2$ that is condensed out has to be re-evaporated at a higher temperature than $-57°$ C., and in so doing it is unable to create temperatures any lower than about $-50°$ C.

The liquid $CO_2$ condensed out of the raw gas by indirect cooling is not pure, but contains other condensed or absorbed gaseous components. This is especially undesirable where the other gaseous components are useful components such as CO and $H_2$. These valuable products often have to be recovered from the carbon dioxide by step-wise relieving of the pressure on the $CO_2$ and recycled back, after recompression, into the gas being purified. If this procedure is followed, it is necessary to use a considerable amount of additional apparatus.

It is an object of this invention to provide a novel process for purifying carbon dioxide containing gases.

It is another object of this invention to provide a simplified process for the separation of carbon dioxide from synthesis gas.

It is a further object of this invention to provide an economical, efficient process for purifying synthesis and other similar gases from carbon dioxide and other impurities.

Other and additional objects of this invention will become apparent from a consideration of this entire specification, including the drawing and claims appended hereto.

In accord with and fulfilling these objects, one aspect of this invention resides in a process for the purification of highly compressed, carbon dioxide-rich gases by washing at low temperatures with an organic polar solvent, which is regenerated by expansion after gas components which condense at ambient temperature have been separated.

The process of the invention is characterized by the fact that the raw feed gas is precooled until the condensation of carbon dioxide begins, and it is then directly refrigerated by the absorbent. The absorbent removes carbon dioxide from the raw gas during this direct refrigeration whereupon the absorbent is regenerated and cooled by the expansion and evaporation of absorbed carbon dioxide therefrom. The absorbent flows countercurrent to the gas, first dissolves the carbon dioxide by absorption and, after extensive saturation, removes it from the gas by predominant condensation.

It has been found that it is simpler and more advantageous from the technical point of view to separate all of the carbon dioxide by absorption into an appropriate liquid absorbent, such as methanol or acetone. If this absorbent is introduced into the $CO_2$ absorption process at a very low temperature, it acts as a chilling agent in a direct heat exchange. The elimination of the large heat exchangers needed in the case of exclusively indirect cooling is a very considerable advantage as regards cost and as regards simplicity of the process.

If, for example, a gas with a total pressure of 150 atm. abs. and a carbon dioxide content of 30 mole-percent is washed with methanol in a washing tower at a sump temperature of $-30°$ C., the quantity of absorbent can be kept so low, if the head temperature is low enough, that the liquid drawn from the sump for regeneration consists of 50 mole-percent and more of carbon dioxide.

For the regeneration and recovery of the absorbent, the $CO_2$ is driven out of the liquid by relieving the pressure, advantageously in several stages, under a vacuum if desired and/or with the cooperation of a stripping gas in the final stage.

Thereupon, the absorbent cools to lower temperatures which are usually below the triple point of carbon dioxide, and is then fed back to the absorption tower as an absorbent and direct refrigerant.

Often, however, the carbon dioxide content in the absorbent leaving the washing tower is so high that the mixture may cool below the melting curve during the regeneration by expansion and the stripping process, if any. In this case, it is advisable to install a heat exchanger in the final expansion stage, ahead of the stripping if any, in which a portion of the cold of desorption of the carbon dioxide and of the perceptible heat of the charged absorbent is transferred indirectly to another current of charged absorbent, which is kept in circulation in the bottom section of the absorption tower so as to cool the raw gas and remove $CO_2$ by condensation, and is drawn from the sump of the washing tower and, after the above-mentioned indirect cooling in the expansion tower, is fed back into the bottom section of the washing tower.

In this manner, the temperature of the absorbent is always kept to a bottom limit of about $-70°$ C., and the carbon dioxide absorbed by it is aways kept in dissolved form. On the other hand, in the case of regeneration by stripping, the temperature is raised by the stripping to such an extent that the stripping gas requirements, which of course increase as the temperature decreases, become reduced.

A small ammonia refrigeration machine, whose evaporator is placed at the warmest point of the absorbent circuit in a cooling system, or is placed parallel to the above-mentioned heat exchanger in the expansion tower, if desired, suffices as an external refrigeration source to compensate the slight refrigeration losses in the process of the invention.

In the case of great pressure differences between absorption and regeneration, i.e., in the case of great differences between the partial pressure of the $CO_2$ in the raw gas and the average partial pressure of the $CO_2$ in the exhaust gases, the Thomson-Joule effect in the carbon dioxide has a particularly useful result, inasmuch as it produces additional refrigeration in the process.

Consequently, the process according to the invention generally succeeds with a small refrigeration machine. In favorable cases it is needed only for the starting up of the plant, while the refrigeration requirements in steady operation are produced from the process itself.

The carbon dioxide that condenses out during the precooling of the gas is advantageously transferred from the sump of the precooler to the sump of the absorption tower. In the bottom end of the absorption tower there is created, according to the invention, a zone serving mainly for the removal of heat from the gas, in which zone the absorbent, greatly enriched with carbon dioxide, is circulated through a refrigerating element which contains, for example, the evaporator of a refrigeration machine. A cold gas current available from other parts of the plant can also be used as a refrigerant at this point.

The process of this aspect of this invention is suitable for the purification of gases which are under a pressure of at least 40 atmospheres gauge, contain at least 15% by volume of carbon dioxide, and contain little or no sulfur compounds. It is therefore especially suitable for raw gases which are produced by high-pressure cleavage from sulfur-free light or heavy mineral oil fractions, refinery gases or natural gases. The high carbon dioxide content of such gases is the result of the fact that the carbon monoxide at first contained in the raw gas is wholly or partially transformed to carbon dioxide by catalytic reaction with steam, with the simultaneous formation of hydrogen.

As another aspect of this invention, the process can be used successfully also with raw gases containing sulfur, if a common, non-selective washing out of the gaseous sulfur compounds with the carbon dioxide is performed. For this purpose the desorption (regeneration) section is merely revised slightly, in that all of the absorbent or a partial current of same is completely regenerated, i.e., also with regard to the sulfur compounds and other raw gas components more easily soluble than $CO_2$. The washed-out sulfur compounds are then contained in high dilution in the $CO_2$ exhaust gases. Possibilities for the use of such exhaust gases are often present.

Aside from the "permanent" gas components, $CH_4$, $CO$, $N_2$ and air, which are removed prior to any synthesis of ammonia in a separate purification stage, usually in a nitrogen washing the raw gas contains only a few other components which have to be washed out together with carbon dioxide and any sulfur compounds that may be present. Special measures are frequently necessitated in this case only by the water-vapor content of the raw gas, although it is very slight on account of the high total pressure of the gas to be purified. Therefore it is often sufficient, where the raw gas is to be precooled to less than 0° C., to add some absorbent to it to prevent the formation of ice. This absorbent is then fed together with the other condensate components from the precooler to the sump of the absorption tower. To prevent any undesirably high water content from building up in the main absorbent circuit, it is sufficient to draw off a very small partial current of same constantly or periodically and subject it to distillation. The purified absorbent is then fed back into the main circuit together with the fresh absorbent required to compensate for the losses.

The process of the invention fits into the synthesis of ammonia, for example, in the temperature difference between the pressure gasification and the final purification by scrubbing with nitrogen. The preferred absorbents are methanol or acetone.

Since the regeneration of the charged absorbent is performed without the consumption of external heat, many heat exchangers become unnecessary. The expense that might be entailed in the compression of the stripping gas nevertheless remains slight, because the amount of stripping gas required is small on account of the great pressure ratio between the absorber and the stripper.

Figure 2:
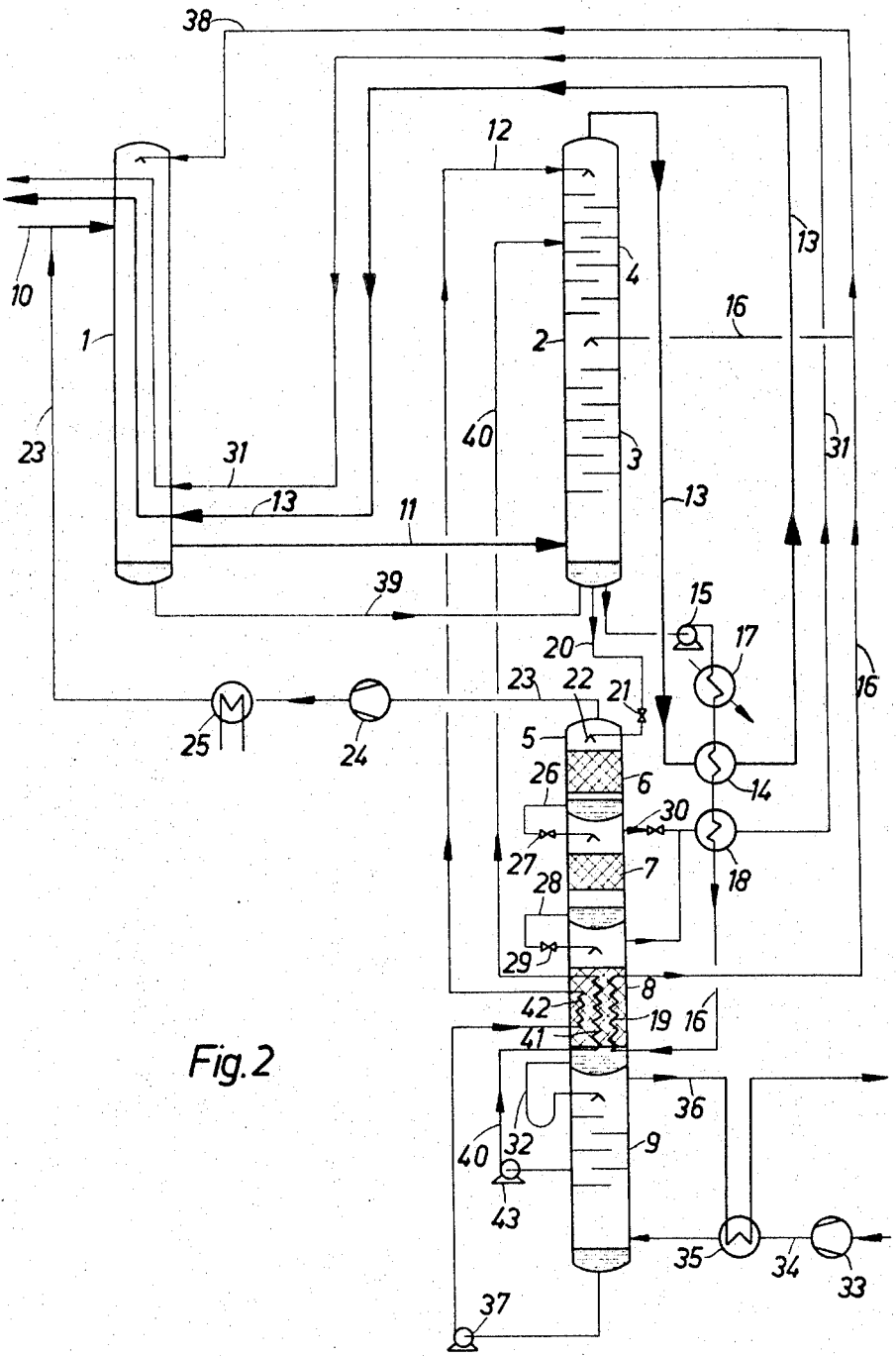

Understanding of this invention will be facilitated by reference to the accompanying drawing in which:

FIG. 1 is a flow diagram for the process of this invention as it is applied to substantially sulfur free raw gases; and FIG. 2 is similar to FIG. 1 for a process according to this invention wherein sulfur containing raw gases are to be purified.

In these drawings like parts have been numbered the same in both figures.

Referring now to these drawings and especially to FIG. 1 thereof, the plant consists of a heat exchanging system 1; an absorption tower 2 with a preliminary washing stage 3 and a final washing stage 4; and a regeneration tower 5 with expansion stages 6, 7 and 8, and a stripping stage 9.

The gas to be purified enters through a line 10 into the heat exchanger 1 and is indirectly cooled therein by the gases flowing out of the process. To prevent the formation of ice in the heat exchanger 1, a small amount of absorbent containing $CO_2$ is injected through a line 38. It is then fed, together with the condensate formed during the cooling of the raw gas, through a line 39 into the sump of the absorption tower 2. The cooled raw gas is introduced through a line 11 into the bottom end of the absorption tower 2 and flows upwards in the latter through the lower preliminary washing zone 3 and the upper final washing stage 4 countercurrent to the cold, regenerated methanol fed in through a line 12 and sprinkled downward from the top.

The gas, scrubbed of $CO_2$, flows down the from the head of the absorption tower through a line 13, picking up heat in heat exchangers 14 and 1 from the charged absorbent and from the raw gas respectively.

In the lower, preliminary washing zone 3, in addition to the methanol sprinkled down from above, a portion of the mixture of methanol and $CO_2$ collecting in the sump is forced by a pump 15 in a line 16 through heat exchangers 14, 17, 18 and 19 and circulated back to the head of the preliminary washing zone. In the heat exchanger 17, the mixture of absorbent and $CO_2$ is cooled by evaporating ammonia, in heat exchangers 14 and 18 it is cooled by cold purified gas in the former and cold exhaust gases in the latter, and it is finally cooled in the haust gas from line 31 can be used for synthesis purabout a partial vaporization of the carbon dioxide contained in the absorbent.

A quantity of methanol equal to the amount fed in through a line 12 is fed together with the dissolved $CO_2$ from the sump of the preliminary washing zone 3 through a line 20 and an expansion valve 21 to a spray nozzle 22 in the head of the top section 6 of the regeneration tower. Here the useful components, mainly $CO$ and $H_2$, dissolved in the mixture of methanol and carbon dioxide, are released by a first partial expansion, and are fed through a line 23 for further utilization, e.g., for recompression in a compressor 24 connected in series with a condenser 25, and reinjection into the raw gas. The partially expanded charged absorbent is fed from the first section 6 of the regeneration tower through a line 26 and an expansion valve 27 into the head of the next section down (7) in the tower, and flows from the latter after further expansion through a line 28 with an expansion valve 29 down through the following tower section 8. The expansion gases from the tower sections 7 and 8 are carried away through lines 30 and 31, combined in the latter, and carried out through the heat exchange system 1. Depending on the purity requirements, the $CO_2$ exhaust gas from line 31 can be used for synthesis purposes after warming in heat exchangers 18 and 1, either directly or after further purification. In tower section 8, the absorbent is expanded to the ambient pressure. To prevent the absorbent from chilling to the point of the separation of solid $CO_2$, and to make use of the refrigeration of desorption from the $CO_2$ that is driven out, a heating system 19 is installed in tower section 8, through which the absorbent circulating through the preliminary washing zone 3 is carried. The absorbent that is to be further regenerated passes through line 32 into tower section 9, which is equipped with exchange baffles, and here it is blown out and completely regenerated by means of a stripping gas which is introduced by the blower 33 through line 34 and a heat exchanger 35 at a point below the baffles, and is carried away above the baffles through line 36 and heat exchanger 35. The pure absorbent is fed back by means of pump 37 through line 12 to the head of the absorption tower 2.

The diagram shown in FIG. 2 for the plant for gases containing sulfur is entirely the same as the one in FIG. 1 in parts 1 to 39. The additional apparatus 40 to 43 serve for the more intensive regeneration of the absorbent.

In the stripping section 9, at a suitable point, a partial amount of the absorbent, which has been regenerated sufficiently as regards $CO_2$, but only partially as regards $H_2S$, is drawn off and driven by means of pump 43 through line 40 and heat exchanger 41 into the middle section of the final washing section 4 of absorption tower 2. The rest of the absorbent runs on into the bottom of stripping section 9 and is there stripped free of $H_2S$ at an elevated gas-to-liquid ratio, before it is driven by pump 37 through line 12 back to the head of absorption tower 2. Between the parts of lines 12 and 40, then, the absorbent first washes out the sulfur compounds remaining in the compressed gas, and then, after the first partial return enters, it washes out the $CO_2$ in the lower section of the absorption tower.

Since for this plant the absorption temperature in the stripping stage 9 is set somewhat higher so as to reduce the stripping gas requirements, the two currents of absorbent in lines 12 and 40 are cooled down again somewhat in heat exchangers 42 and 41 before they are fed back into the absorption tower 2.

The process described above will now be further explained by a quantitative example with reference to FIG. 1.

*Quantitative example*

The starting product is a raw gas produced from desulfurized light gasoline by the steam reforming process and thereafter converted. The gas has been cooled after conversion to the ambient temperature and then enters the purifying process with the following composition:

|  | mole-percent |
|---|---|
| $CO_2$ | 31.5 |
| $CO$ | 3.0 |
| $H_2$ | 64.0 |
| $CH_4$ | 1.0 |
| $N_2+Ar$ | 0.5 |

The quantity is 50,000 $Nm.^3/h$. The washing process operates with methanol as the absorbent.

First the raw gas flows through line 10 at a temperature of about 30° C. and a pressure of about 110 atmospheres absolute into the heat exchanger 1 in which it is cooled to about $-3°$ by indirect heat exchange with the cold exhaust gases. Approximately 1,000 $Nm.^3/h$. of the raw gas thereupon condense and are fed, together with the small amount of methanol added through line 38 to prevent ice formation, into the sump of the washing tower 2. The compressed gas carried through line 11 into the tower 2 is then freed of the $CO_2$ by refrigeration and absorption down to a residual content of about 10 p.p.m. For this purpose approximately 40 $m.^3$ of methanol per hour is fed to the head of the washing tower, where it is sprinkled down against the flow of the compressed gas over the exchange baffles, leaving the washing tower at a temperature of about $-10°$ C. Then the three-stage expansion of the methanol in chambers 6, 7 and 8 of the regenerating tower chills the methanol down to about $-70°$ C., and it is then heated up again slightly by the heating coil installed in chamber 8, before it is again chilled down to about $-60°$ C. in the stripping stage that next follows, by the additional gassing out of $CO_2$. It is pumped back into the head of the washing tower at this temperature. In the refrigeration circuit in the bottom part 3 of washing tower 2, about 50 $m.^3$ of methanol heavily charged with $CO_2$ is circulated through pump 15, heat exchangers 17, 14, 18 and 19, and line 16. This refrigerating methanol produces an intensive refrigeration of the compressed gas rising in the washing tower, so that a large part of the $CO_2$ contained in the compressed gas is separated out merely by condensation alone.

Approximately 5,000 $Nm.^3/h$. of inert gas, e.g. nitrogen, is used for the final regeneration of the washing methanol in the stripping stage 9 of the regeneration tower 5. This nitrogen can be conveniently provided from an air dissociation plant which supplied the oxygen for the pressure gassification portion of this process. The refrigeration capacity required in the ammonia evaporator 17 in order to compensate the refrigeration losses in the process amounts to approximately 250,000 kcal./h.

The purified compressed gas leaves the washing tower 2 with a temperature of about $-58°$ C., and is then heated back up to the ambient temperature in the heat exchangers 14 and 1. If, however, after the removal of the $CO_2$, the compressed gas is freed of $CH_4$, CO, and Ar in a nitrogen scrubbing process, it is fed to the nitrogen scrubber at low temperature before entering the heat exchanger 14, and then the synthesis gas mixture produced in this scrubber is returned to the ambient temperature by the heat exchangers 14 and 1. The repurification of the methanol has not been shown in FIG. 1 for the sake of simplicity. In the present example, about 1 cubic meter per hour must be subjected to a distillation in order to keep the water content brought in by the raw gas sufficiently low.

What is claimed is:

1. In the process for the removal of carbon dioxide from a highly compressed carbon dioxide rich mixed gas by the absorption thereof with an organic polar absorbent; the improvement which comprises indirectly pre-cooling said gas to an extent sufficient to condense some of said carbon dioxide; feeding said uncondensed mixed gas and said condensate to an absorption stage; contacting the mixed gas and condensate with at least two streams of said absorbent, the first of said streams of absorbent being cooled without expansion by indirect heat exchange to a temperature substantially below the temperature of the mixed gas entering the absorption stage and recycled into the lower section of said absorption stage, while at least one other stream of the absorbent is regenerated by flashing in a multiplicity of stages and by stripping with a cold inert gas and is recycled to the upper section of said absorption zone.

2. The improved process claimed in claim 1, wherein said gas contains at least about 15% by volume carbon dioxide.

3. The improved process claimed in claim 1, wherein said gas is under a pressure of at least about 40 atmospheres gauge.

4. The improved process claimed in claim 1, wherein a portion of said recovered carbon dioxide is utilized to provide said pre-cooling.

5. Process as claimed in claim 1 wherein the absorbent stream to be regenerated by flashing and stripping is passed from said absorber through three successive expansion steps; while the other absorbent stream leaving the absorber is circulated and cooled successively by external refrigeration, by the absorber overhead gas stream, by the combined flash gases from the second and third expansion step of said absorbent stream being regenerated and then by the flashed liquid in the third flash zone whereby said flashed liquid in the third flash zone is warmed to an extent sufficient to prevent solidification of carbon dioxide and separation thereof.

6. Process after claim 5, wherein the stripping stage of the absorbent regeneration is divided, wherein a partially regenerated portion of the flow of the washing agent is drawn off at intermediate height and is fed into the upper section of the absorption tower substantially below the head; and wherein the rest of the absorbent is completely regenerated in the lower portion of the stripping stage with a correspondingly higher gas-to-liquid ratio, and is then fed to the head of the absorption tower.

References Cited

UNITED STATES PATENTS

| | | | |
|---|---|---|---|
| 2,826,266 | 7/1930 | Hachmuth et al. | 62—17 |
| 2,880,591 | 4/1959 | Kwauk | 62—17 |
| 2,926,753 | 3/1960 | Kohl et al. | 55—68 XR |

FOREIGN PATENTS 644,900  7/1962  Canada.

NORMAN YUDKOFF, *Primary Examiner.*

V. W. PRETKA, *Assistant Examiner.*

U.S. Cl. X.R.

55—68; 62—23, 27

UNITED STATES PATENT OFFICE
CERTIFICATE OF CORRECTION

Patent No. 3,453,835 July 8, 1969

Gerhard L. Hochgesand

It is certified that error appears in the above identified patent and that said Letters Patent are hereby corrected as shown below:

Column 6, line 38, cancel "the", second occurrence; line 52, "haust gas from line 31 can be used for synthesis pur-" should read -- heat exchanger 19 by degassed absorbent. This brings --; lines 71 and 72, after "expansion" insert -- exhaust --.

Signed and sealed this 19th day of May 1970.

(SEAL)
Attest:

Edward M. Fletcher, Jr.
Attesting Officer

WILLIAM E. SCHUYLER, JR.
Commissioner of Patents